United States Patent [19]
Hally et al.

[11] Patent Number: 5,143,308
[45] Date of Patent: Sep. 1, 1992

[54] RECYCLING SYSTEM

[75] Inventors: Nazim S. Hally, Wilmington; Eric J. Koelsch, Newark; Joseph M. Shields, Jr., Wilmington, all of Del.

[73] Assignee: Plastic Recycling Alliance, LP, Chadd Ford, Pa.

[21] Appl. No.: 674,986

[22] Filed: Mar. 26, 1991

[51] Int. Cl.$^5$ .............................................. B03B 9/06
[52] U.S. Cl. .................................... 241/76; 241/79.1; 241/DIG. 38; 209/44.1; 209/557; 209/630; 209/930
[58] Field of Search ............... 241/DIG. 38, 79.1, 76; 209/930, 44.1, 629, 630, 555, 557, 12

[56] References Cited
U.S. PATENT DOCUMENTS

| | | | |
|---|---|---|---|
| 3,524,594 | 8/1970 | Anderson et al. ...................... | 241/76 |
| 4,511,302 | 4/1985 | Moore ................................... | 414/327 |
| 4,830,188 | 5/1989 | Hannigan et al. ...................... | 209/3 |

FOREIGN PATENT DOCUMENTS 0304667 3/1989 European Pat. Off. ........... 209/44.1
3535633 4/1987 Fed. Rep. of Germany ... 241/DIG. 38

OTHER PUBLICATIONS

"Plastics Recycling Gains Momentum", Chemical Engineering, Nov. 1990 p. 39.

Primary Examiner—Mark Rosenbaum
Assistant Examiner—John M. Husar

[57] ABSTRACT

Apparatus and process for recycling post-consumer plastic containers supplied as compressed bales thereof to recover at least uncolored and colored PET uncolored and colored HDPE in flake form is provided. The apparatus and process includes debaling, sortation of the desired containers from the bale, granulation of these containers into flakes, wet processing to dissolve glue and the residue of contents of the containers and to provide separation of contaminants from the desired flake by specific gravity difference, and recovery of the purified flakes.

16 Claims, 9 Drawing Sheets

RECYCLING SYSTEM

FIELD OF THE INVENTION

This invention relates to a system for the recycling of post-consumer rigid plastic containers.

BACKGROUND OF THE INVENTION

The collection of post-consumer rigid plastic containers has recently begun. "Post-consumer" means that the consumers have used the contents of the containers and then disposed of them. The problem arises as to how to recycle these containers for beneficial purpose rather than dispose of them in landfill or by incineration. The term "recycle" means remelt-fabrication into useful articles, as distinguished from returning the container to the bottle for cleaning and refilling.

Solution to the problem faces serious obstacles. It has become convenient to "package" post-consumer rigid plastic containers as bales of crushed containers held together by strapping or other securement. The crushing of containers removes air from the inside of the containers and provides a densified mass which has economy in transportation and ease of handling. One obstacle to the recycling of these bales of containers is that the bales must be broken down in individual containers for recycle processing.

Difficulties in breaking down bales of crushed post-consumer rigid containers include the degree of compaction of the bales which varies at least from site-to-site where the baling is done, so that the debaling has to accommodate the different degrees of bale integrity. In addition, the crushed containers in the bales tend to stick to one another, either by physical interlocking caused by the crushing process and/or by adhesion caused by sticky residue of the contents of the containers and/or by cohesion between container surfaces forced together by the crushing process. One of the most common plastics used for rigid containers, i.e., polyethylene terephthalate (PET) is particularly susceptible to such cohesion.

Another obstacle arises from the content of the bales of crushed containers. The plastics content varies from bale to bale, i.e., the bales will generally contain a mixture of containers of different plastics, and the proportion of containers of particular plastics will vary from bale to bale. The composition of the bales will also vary from source to source. Curbside trash collection which includes rigid plastic containers segregated from the rest of the trash produces different mixtures from neighborhood to neighborhood and region to region. The same is true for the collection of post-consumer rigid plastic containers from separation activity carried out at regional centers such as material recovery facilities (MRFs) for the receipt of consumer trash. Bales concentrated in PET soda bottles may be obtained from deposit bottle collection points. The same is true of high density polyethylene (HDPE) milk and water bottles. The containers of still other plastics are commingled in varying proportions in these bales. Any recycle operation for post-consumer rigid plastic containers must be able to process bales of crushed containers from all these sources and of all compositions.

Another obstacle to the recycle of post-consumer rigid plastic containers is economics. The recycle plastics must have value in order for the recycle operation to succeed. The value of recycle plastics tends to be "capped" by the selling price of virgin resin of the same identity. Recycle plastic tends to have a lower value than virgin resin, because the recycle plastic may not be as good as the virgin resin, i.e, the physical properties of the virgin resin are may be degraded by the presence of post-consumer contaminants and/or the degradation that may occur in the remelting of the recycle plastic.

Heretofore PET soda bottles have been subjected to recycling, wherein a loose collection of these bottles were delivered to the recycling operations. These PET soda bottles included the HDPE base cup and label which are adhered to the PET bottle by glue, the label generally being either polypropylene film or paper. These bottles also included the cap retaining ring and sometimes even the bottle cap of aluminum or polypropylene. Sometimes, however, for ease of recycling, the base cup was removed by hand prior to feeding the PET bottle to the recycle operation. In this process operation, the feed was pure PET bottle in its original shape and free of dirt, trash and other contaminants, and the step of removal and separation of the PET portion of the bottle from the base cup and label contaminants was all that had to be solved technically and economically for a viable recycle process.

The problem of the recycle of post-consumer rigid plastic containers in the form of bales of varying composition of commingled crushed containers of different plastics has to be solved within the same economic framework, but now with the greater difficulties arising from this bale feed to the recycle operation. Typically, a bale of crushed post-consumer rigid plastic containers contains various plastics in the following approximate minimum amounts based on the total weight of the bale: 30 weight percent PET, 30 weight percent HDPE, 0.5 weight percent polyvinyl chloride (PVC), 0.5 weight percent polypropylene (PP) and 0.5 weight percent polystyrene (PS). In addition, the typical bale contains such additional contaminants as plastic film, dirt, paper, aluminum and other trash and the residue from contents of the crushed containers. Typically, the combined PET and HDPE contents of bales of crushed post-consumer containers will comprise 70 to 90% by weight of the bale.

Recycling of post consumer commingled rigid plastic containers also requires that commingled containers of different plastics be processible regardless of condition. Bales of these crushed containers derived from association with trash presents an appearance of a dirty mass of objects with some of the various colors of the different plastics present being muted by the presence of dirt and other trash. Nevertheless, the outgoing recycle plastic must have the appearance of quality, i.e., appear clean, shiny and pristine, and free of color contamination. It is no wonder that the article entitled "Plastics Recycling Gains Momentum", Chemical Engineering (Nov., 1990) states on page 39 as follows:

"Plastic recyclers use either mixed, commingled plastic streams—which are next to impossible to segregate economically [emphasis supplied]—or specify that only the pure stream be purchased."

SUMMARY OF THE INVENTION

The present invention in large measure overcomes the obstacles to the solution of the problem of recycling post-consumer commingled rigid plastic containers. The present invention is able to accept bales of the crushed containers of varying composition and condition and transform these bales into at least recycle PET and HDPE of high purity.

The present invention can be described in terms of apparatus for the recovery of at least uncolored polyethylene terephthalate (PET), colored polyethylene terephthalate (PET), uncolored high density polyethylene (HDPE), and colored high density polyethylene (HDPE) from a compacted mass of post consumer plastic articles comprising crushed containers of uncolored PET, or colored PET, of uncolored HDPE, and of colored HDPE and at least two additional plastics selected from the group consisting of articles of polypropylene (PP), polystyrene (PS), and polyvinyl chloride (PVC), and at least three contaminants selected from the group consisting of paper, metal, glue, plastic film, dirt and residue from the contents of said containers, the association of said containers and contaminants in said compacted mass including both (i) a physical mixture thereof as in the case of a mixture of containers of different plastic identities and as in the case of containers being associated by coating with the residue of their contents and/or dirt, (ii) mechanical engagement between plastic containers or between plastic containers and said contaminants as in the case of screw-on bottle caps on containers and retaining rings for said caps, and (iii) adhesive engagement between plastic containers and contaminants caused by said glue as in the case of container labels and base cups for containers, whereby a plastic article in said engagement with a plastic container of different plastic identity is also a contaminant for said different plastic, said apparatus comprising (a) means for breaking down the physical mixture of said crushed containers in said compacted mass into individual containers, (b) means for conveying said individual containers and their associated contaminants along a path, including means for distributing said containers within said path so as to be separable from one another by sortation, (c) means for sorting said containers of uncolored PET, colored PET, uncolored HDPE, and colored HDPE from one another and from the remainder of the broken-down compacted mass being conveyed by said conveying means, by selective removal of said containers of uncolored PET, colored PET, uncolored HDPE, and colored HDPE from said conveying means, said containers including associated contaminants, (d) means for collecting the remainder of said broken-down compacted mass after being subjected to said sorting means, (e) means for separately granulating the sorted containers of uncolored PET, colored PET, uncolored HDPE, and colored HDPE to form flakes of said containers, (f) means for separating said contaminants from the flakes of said granulated articles, which contaminants become separable from said flakes as a result of being subjected to said granulating means, (g) means for treating said flakes to remove remaining contaminants therefrom, said treatment including wet processing so as to remove any dirt, residue of contents, and at least the glue present on said flakes, whereby the adhesively engaged contaminants become removable from said flakes, (h) means for drying the resultant substantially pure flakes, and (i) means for collecting the resultant substantially pure flakes of uncolored PET, colored PET, uncolored HDPE, and colored HDPE separate from one another so as to be available for recycling by melt fabrication.

The present invention also contemplates the process for carrying out the recovery operation described above.

DESCRIPTION OF THE DRAWINGS

FIG. 2 is a side elevation of means for breaking down a compacted mass of crushed post consumer plastic containers into individual containers.

FIG. 3 is an enlarged front elevation of the portion of the breaking down means where the break down into individual containers occurs.

FIG. 4 is a side elevation of means for delivering the individual containers to the sorting operation.

FIG. 5 is an enlarged isometric view of the exit end of a trommel cylinder used as part of the delivery means shown in FIG. 4.

FIG. 6 is a further enlargement of a portion of the sidewall of the trommel cylinder of FIG. 5.

FIG. 7 is a plan view of one embodiment of means for conveying the individual containers into and through the sortation operation.

FIG. 8 is a side elevation in enlargement of means for granulating a sorted container into flakes.

FIG. 9 is a side elevation of means for separating contaminants from the granulated flakes.

FIG. 10 is a plan review of one embodiment apparatus for wet processing PET flakes so as to remove contaminants therefrom.

FIG. 11 is a side elevation of the flotation classifier means shown in FIG. 10.

FIG. 12 is an end view elevation of the wet processing apparatus shown in FIG. 10.

FIG. 13 is a side elevation of means for drying the wet processed flake and for collection of the resultant substantially pure flakes.

FIG. 14 is a plan view of an alternative arrangement of apparatus for wet processing of PET flakes so as to remove contaminants therefrom.

FIG. 15 is a side elevation of another emobidment for separating contaminants from wet processed flakes.

FIG. 16 is a plan view of one embodiment of apparatus for wet processing HDPE flakes so as to remove contaminants therefrom.

FIG. 17 is an enlarged side elevation of means for floating HDPE flakes for separation from heavier contaminates for use in the apparatus shown in FIG. 16.

DESCRIPTION OF PREFERRED EMBODIMENTS

Figure 1:
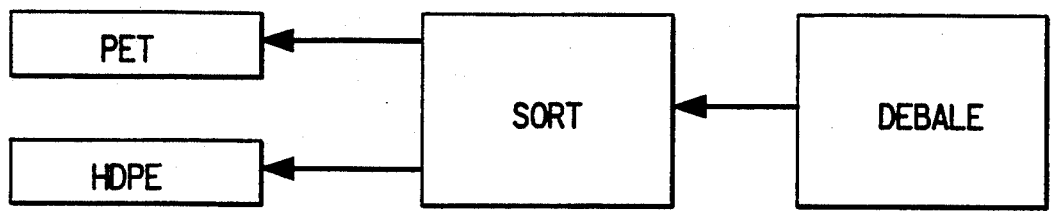
FIG. 1 is a block diagram of the overall recycle operation described herein.

Practice of the present invention involves three general operations, as depicted in FIG. 1, of first breaking down bales of crushed post-consumer plastic containers, then sorting them to separate the PET and HDPE containers from one another and from the remainder of the bales, followed by processing the sorted containers to remove contaminants therefrom and present them in a form suitable for remelt fabrication into useful articles. In accordance with the preferred operation of the present invention, the PET containers are separately sorted into uncolored (clear) PET and colored (green) PET, and the HDPE containers are separately sorted into uncolored (uncolored or natural HPDE has a cloudy, translucent appearance) and colored HDPE, whereby at least these four sortation streams of containers are processed for contaminant removal. The containers are primarily rigid containers in the sense that they have a self-sustaining shape, as opposed to film pouches which collapse when empty. The containers include bottles used for carbonated and non-carbonated beverages, milk and water jugs, detergent, and salad or cooking oil bottles, food trays and domes, and rigid plastic packaging used for many other consumer applications. The PET and HDPE plastics from which the containers are made can include the presence of comonomer in the PET and HDPE plastic, but the containers from these copolymers are still considered PET and HDPE containers.

Figure 2:
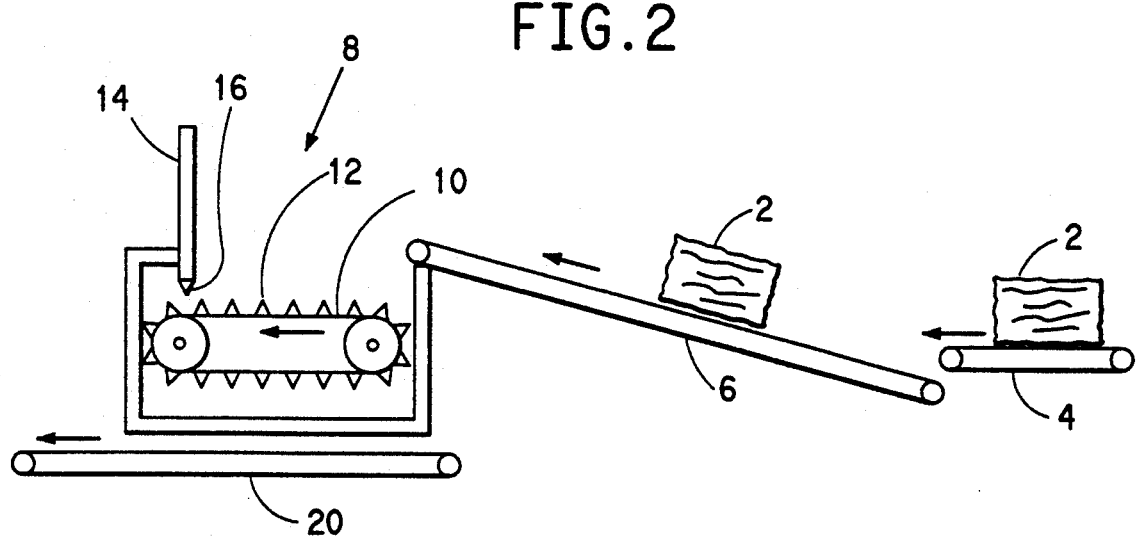
FIGS. 2–17 are schematic representations of apparatus suitable for carrying out this recycle operation.

In the first operation, as depicted in FIG. 2, a bale 2 of crushed containers is placed on a conveyor 4 which transfers the bale to an inclined conveyor 6 which, in turn, conveys the bale to debaling means 8. A second bale 2 positioned on the inclined conveyor 6 is shown in the drawing en route to the debaling means 8. The bales fed into this operation are the compacted mass of crushed containers described hereinbefore having the composition described hereinbefore.

Figure 3:
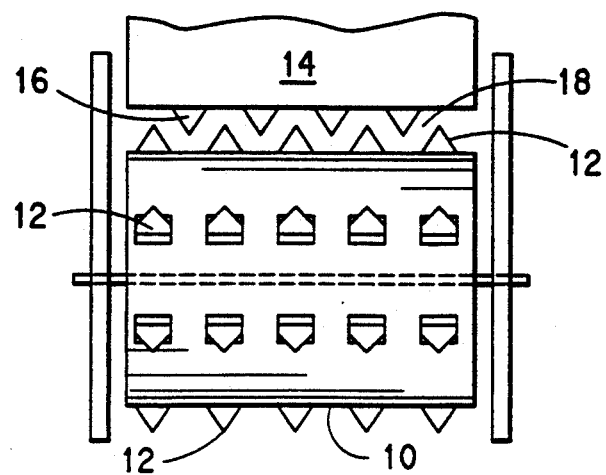

The debaling means 8 depicted in FIGS. 2 and 3 comprises a belt 10 having a plurality of teeth 12 such as the rows of teeth spaced along the length of the belt as shown in the drawing or arranged more randomly along and across the belt. Conveyor 6 transfers a bale 2 to belt 10, which in turn conveys the bale towards a barrier 14. A series of teeth 16 are positioned along the bottom edge of the barrier 14. Barrier 14 is adjustable by conventional means (not shown) towards and away from the belt 10 to form a gap 18 between teeth 12 of the belt and teeth 16 of the barrier. As shown in FIG. 3, the teeth 16 and 12 are offset from one another so as to provide a jagged opening for crushed containers from bale 2 to pass through. The teeth 16 are stationary, subject to vertical adjustment of barrier 14, and the teeth 12 move relative to teeth 16 with the movement of belt 10. The conveying action of belt 10 forces the bale against barrier 14 and the teeth 12 then proceed to successively rip away layer after layer of crushed containers from the undersurface of the bale until the entire bale is consumed. The containers ripped away from the bale are forced though gap 18 by teeth 12, whereby the crushed containers are essentially individualized, i.e., separated from one another. Preferably, the perpendicular distance between teeth 12 and 16, which defines the gap presented to the containers being forced through it, is from about 7.6 to 10.2 cm. The containers are deposited onto conveyor 20 which moves the containers in the direction shown. The bales 2 are fed to the debaler 8 at a rate that substantially all of one bale is debaled before another bale is transferred by conveyor 6 to belt 10. A debaler of the type just described can be obtained from the Hustler Conveyor Company and is further described in U.S. Pat. No. 4,511,302.

Figure 4:
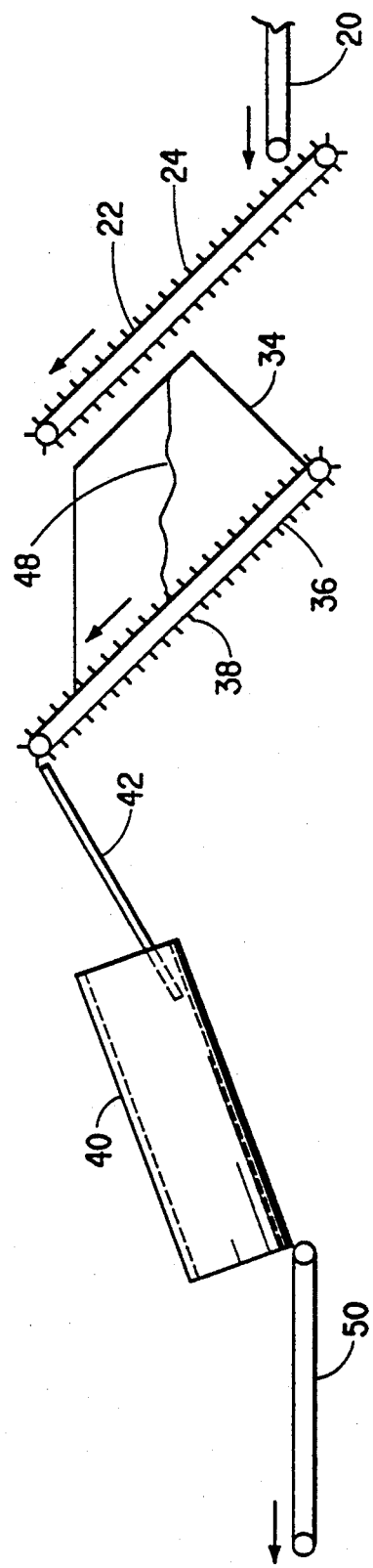
Figure 6:
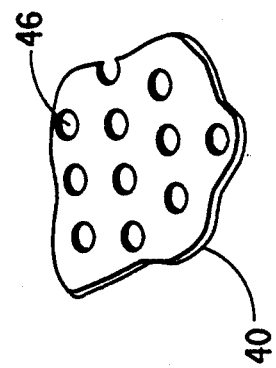
Figure 5:
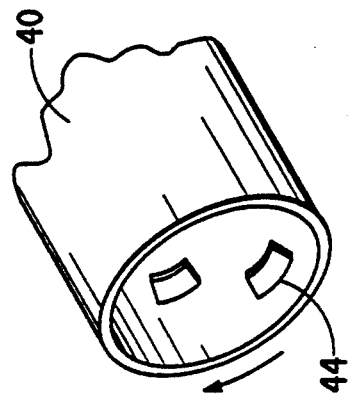

These essentially individualized crushed containers are next delivered to the sortation operation by delivery means, an embodiment of which is shown in FIG. 4. Conveyor 20 transfers the containers to an inclined conveyor 22 having cleats 24 spaced there along for conveying the containers to the top (discharge end) of the conveyor. The containers are discharged by conveyor 22 into a surge bin 34. From the surge bin 34, a second inclined conveyor 36 having cleats 38 is provided to remove the containers from the surge bin 34.

The containers are next fed to a rotating cylinder 40 often referred to as a trommel by conveyor 36 via chute 42. The trommel is equipped with paddles 44 affixed to the inner wall of the cylinder so that as the trommel rotates about its longitudinal axis the paddles repeatedly lift the containers and drop them against the cylinder inner wall as the containers traverse the length of cylinder. Typically the angle of the cylinder with the horizontal will be sufficient to insure this traversal occurs by gravity flow, and generally the angle of inclination of the cylinder will be from 10 to 25 degrees. The repeated lifting and dropping of the containers as they traverse the length of the cylinder 40 performs a further separation of containers from one another to the extent this is not accomplished by the debaler. In addition, this "knocking around" of the containers serves to separate some of the contaminants associated with the containers. The cylinder is perforated with holes 46 to permit the contaminants separated by the tumbling of the containers to pass through the holes for collection in a bin (not shown) positioned beneath the cylinder. Such contaminants include loose bottle caps, pieces of paper, dirt, and other products discarded with the containers. Typically, the perforations will be holes having a diameter of 3 to 6 cm.; the perforations should not be so large that the containers themselves becomes lodged therein.

The containers exiting the cylinder 40 fall onto conveyor 50 where the sortation operation begins.

The purpose of the presence of the surge bin 34 between the debaling and sortation operations is to provide for interim collection of the crushed containers for a constant feed to the sortation operation. The sortation conveyor 50 can operate at a speed of 80 ft./min. and the bin is charged with sufficient containers to deliver containers via conveyor 36 and cylinder 40 at this rate. The debaler operates more efficiently at a higher rate, e.g, a belt 10 speed of 150 ft./min. At this higher speed, coupled with a steady supply of bales 2 to the debaler, the surge bin 34 could be overflowed with crushed containers. This is avoided by providing the surge bin with a control which shuts off the operation of the debaler 8 and its feed conveyors 4 and 6 when a predetermined amount of containers are present in the bin. This control and interlock between it and the operation of the debaler and feed conveyors can be accomplished by conventional means. For example, the pre-determined amount can be determined by a level detector so that when the amount of crushed containers within bin 34 reaches a certain level, e.g., level 48 in FIG. 4, the operation of the debaler and feed conveyors is stopped. When the operation of conveyor 36 removes sufficient containers that the level of containers falls to a predetermined level, then the level control can initiate the operation of the debaler and feed conveyors until level 48 is reached again.

Figure 7:
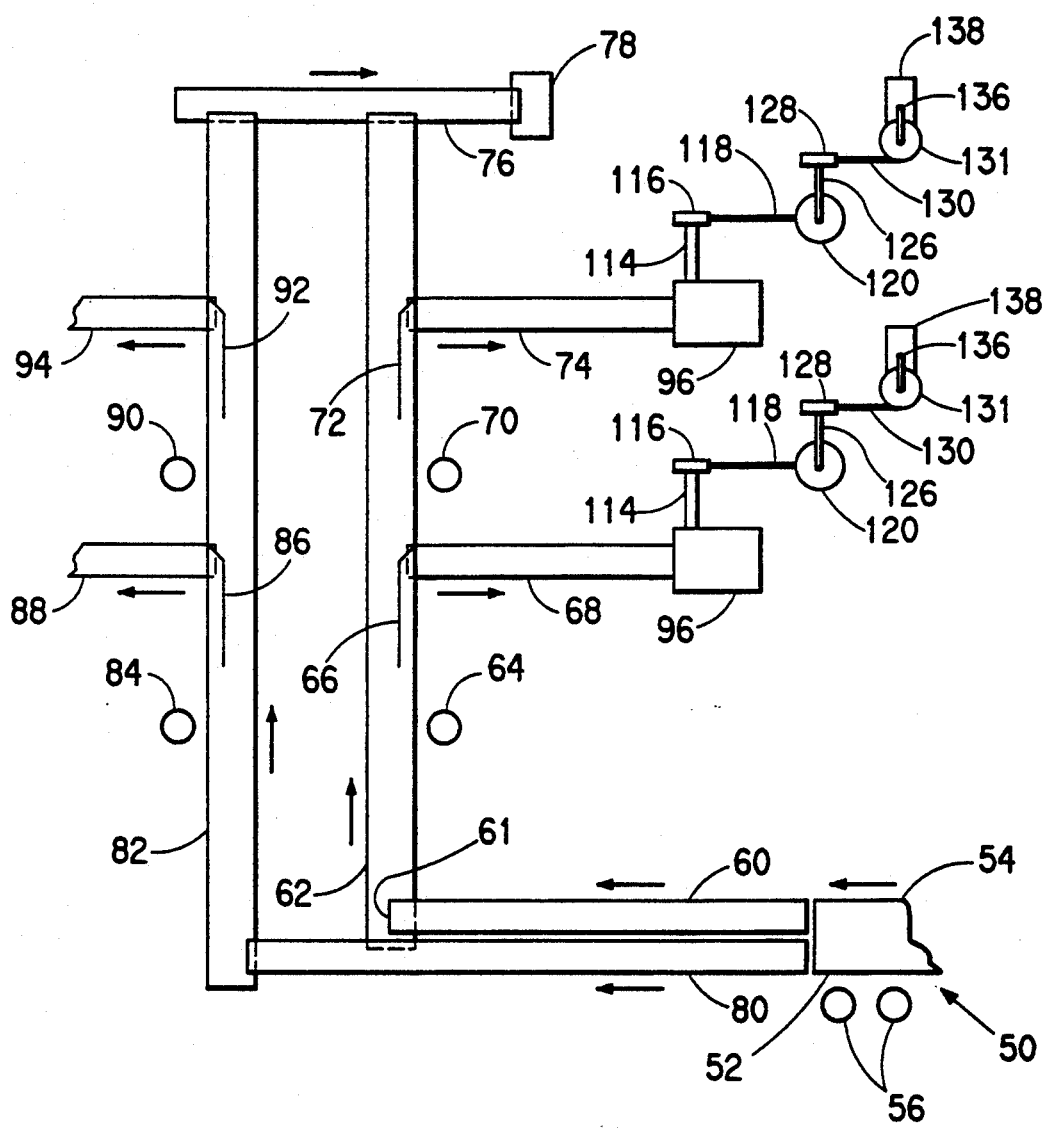

With reference to FIG. 7, the sortation operation can be conducted by the cylinder 40 (FIG. 4) directing the crushed containers to one side of the sortation conveyor 50, e.g., side 52 shown in FIG. 7. Sortation positions 56 operate to relocate the uncolored and colored PET containers from side 52 to side 54 of conveyor 50 as the containers travel along the path of conveyor 50, conveyor 50 representing the first conveyor in a series of conveyors used in the sortation operation. The sortation on conveyor 50 can be done manually from positions 56, by people trained in recognizing crushed PET containers picking the PET containers from all the other containers present along side 52 and placing them on side 54. If conveyor 50 is too wide for convenient reaching to accomplish this placement, side 54 can be bounded by a fixed "backboard" (not shown), and the operators can rebound the PET containers off this backboard to a position on side 54 of the conveyor.

Conveyor 60 receives the PET container feed from conveyor 50, and conveyor 80 receives the remaining containers and all other contaminants from the bale which travel with the containers through cylinder 40 (FIG. 4). Conveyor 60 transports the crushed PET containers to sortation conveyor 62. As the crushed PET containers are conveyed along the path defined by conveyor 62, the uncolored PET containers are displaced to the right hand side of the conveyor at sorting position 64. These containers are then removed from conveyor 62 by deflector 66 which defines a separate path for the containers and then diverts them onto granulation conveyor 68.

The remaining containers on conveyor 62 are sorted again at position 70, with the colored PET containers being displaced to the right hand side of the conveyor for diversion by deflector 72 onto granulation conveyor 74. All other crushed containers and any other articles being conveyed by conveyor 60 continue along the path of this conveyor to be deposited onto collection conveyor 76 and then into collection bin 78.

A similar operation occurs for the crushed HDPE containers. These containers and all other containers and articles from the bale which pass through the cylinder 40 are conveyed along the path defined by conveyor 80. This remainder of the bale is transferred to sortation conveyor 82, and as it travels along conveyor 82, the uncolored HDPE containers are displaced to the left hand side of the conveyor at sorting position 84 to be directed by deflector 86 onto granulation conveyor 88. At sortation position 90, the colored HDPE containers are displaced to the left hand side of conveyor 82 to be diverted by deflection 92 onto granulation conveyor 94. Conveyors 62 and 82 represent a pair of second conveyors on which the sortation which removes the PET and HDPE containers from the broken down bale and separates them by color, i.e., in uncolored vs. colored, is done. The conveyors can conveniently be belt conveyors, but other means of transporting the containers through sortation can be used.

The remainder of the bale continues on to the end of conveyor 82 to be received by collection conveyor 76 for transport to bin 78 along with articles left over from the PET container sortation. The remainder of the bale received by bin 78 consists mainly of PVC, PP, PS, and trash, but sometimes HDPE and PET containers in sufficient quantity reach this bin as well, in which case the contents of the bin can be discharged onto conveyor 50 for re-sortation. Alternatively, sortation can be carried out on conveyor 76 to sort out additional desirable plastic from the remainder of the bale. The contents of bin 78 which is not recycled may be useful for low-cost melt fabricated articles. Most of the PVC and PS present in the bale feed to the process will end up in bin 78 not having been sorted out with the HDPE and PET containers. The crushing of the containers in the bale feed causes the PVC and PS containers to whiten at creases and folds which makes them recognizable as such.

The sortation at positions 64, 70, 84, and 90 can be done manually, with the sortation operators at these positions doing the container displacement as the containers and other articles from the bales travel along their respective conveyors. This sortation is positive sortation in the sense that the containers desired at a particular sortation position have to be laterally displaced so as to be diverted by a deflector 66, 72, 86, or 92. If the container is not laterally displaced, it will travel to collection conveyor 76 for collection in the waste bin 78.

The relationship of conveyors 60 and 80 to sortation conveyors 62 and 82 are such that conveyors 60 and 80 deliver their contents to the proper side of their respective sortation conveyor. Thus, the end of conveyor 60 extends sufficiently far over sortation conveyor 62 that the containers are received by the left-hand side of conveyor 62. Conveyor 80 delivers its contents to the right-hand side of sortation conveyor 82. This sets the stage for the desired PET containers being displaced to the right to be caught by deflectors 66 or 72 and for the HDPE containers being displaced to the left to be caught by deflectors 86 and 92.

The positioning of the conveyors 60 and 80 with respect to the sortation conveyors can be changed to achieve the same results. For example, the conveyors 60 and 80 can be positioned in line with their respective sortation conveyors, but aimed to deliver their contents to the proper side of sortation conveyors for carrying out the sortation operation described above.

Automatic sortation would be desired, but up to the present time this has not been demonstrated to be as reliable as manual sorting at reasonably high sortation conveyor speeds for the crushed, dirty condition of the containers supplied by the bales. It is critical for example to remove the PVC containers from the PET containers. Just the presence of one PVC container contamination in 10,000 containers of PET can severely undermine the value of the recycled PET. Manual sorting has been best able to provide this purity at reasonable operating speeds.

The granulation conveyors 68, 74, 88, and 94 conveyor their respective crushed containers to granulators which comminute the containers to small pieces, generally in the shape of flakes. Flakes have the original thickness of the container and lateral dimensions which reflect the extent of comminution. Flakes with lateral dimensions ranging from $\frac{1}{4}$ in. to $\frac{1}{2}$ in. are desirable for ease of handling and use in subsequent remelt fabrication operation. Preferably, a separate granulation is provided for each sorted stream of containers so that sortation and granulation can be continuous for each stream.

Figure 8:
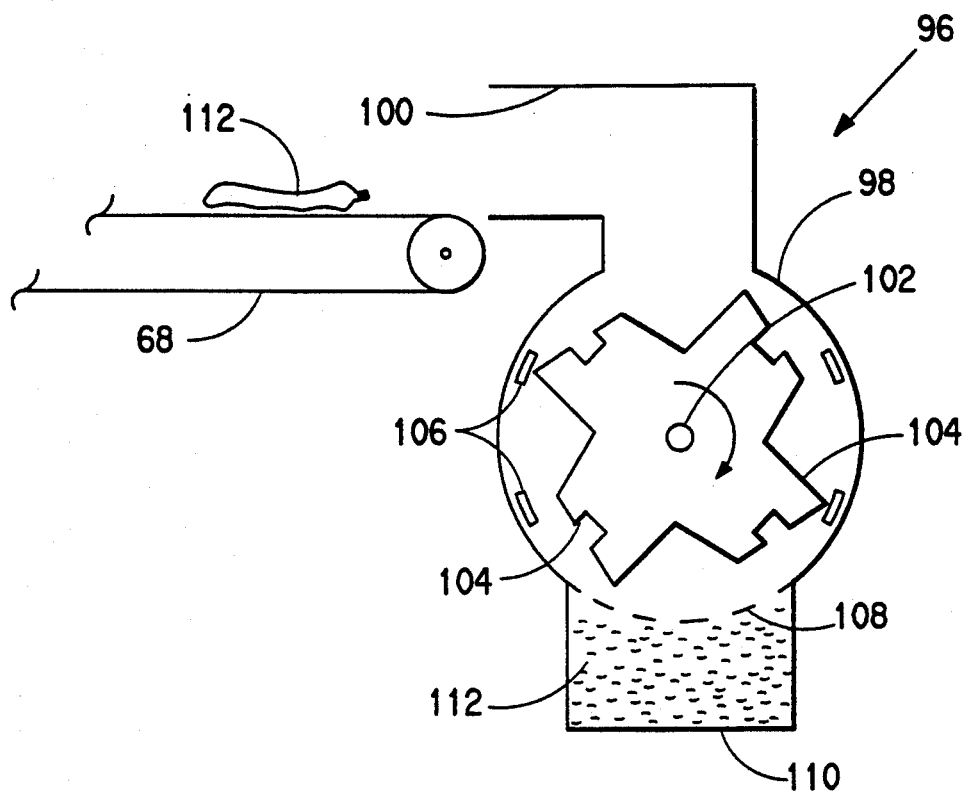

In FIG. 7, granulator 96 is provided for the stream of crushed uncolored PET containers. This embodiment of granulator is best shown in FIG. 8 comprises a housing 98 and an inlet 100 to the upper portion of the housing. Within the housing is positioned a rotating shaft 102 having cutting blades 104 extending radially therefrom. Cutting bars 106 are positioned to just clear the reach of the blades as the drum rotates. The bottom of the housing is defined by a screen 108 and a receiving chamber 110. In operation, a crushed bottle 112 is fed by conveyor 68 into the granulator housing 98 via inlet 100. The high speed rotation of the blades past the cutting bar causes the bottle to be broken down into flakes. When the flakes are small enough to fit through the holes in the screen, they pass into chamber 110 where they are represented as flakes 112 in FIG. 8. Preferably, the screen has holes of about $\frac{3}{8}$ in. in diameter, whereby this represents the largest lateral dimension of the flakes. A granulator of this type is available from the Rapid Company, but other apparatus for granulating plastic containers can be used.

The granulator also breaks down the contaminants associated with the container. For example, any caps and retaining rings mechanically engaged with the PET container present become separate particles mixed with the PET flakes produced by the granulator. The same is true of container labels and base cups except where the glue is sufficiently strong to continue the adhesion of portions of labels and base cups to the PET flakes. Paper and film contaminants are somewhat shredded by the granulation and some of the dirt and some dried residue of the contents of the containers become separable from the PET flakes by the granulation. The PET flakes 112 reaching the chamber 110 are physically mixed with these contaminants.

Figure 9:
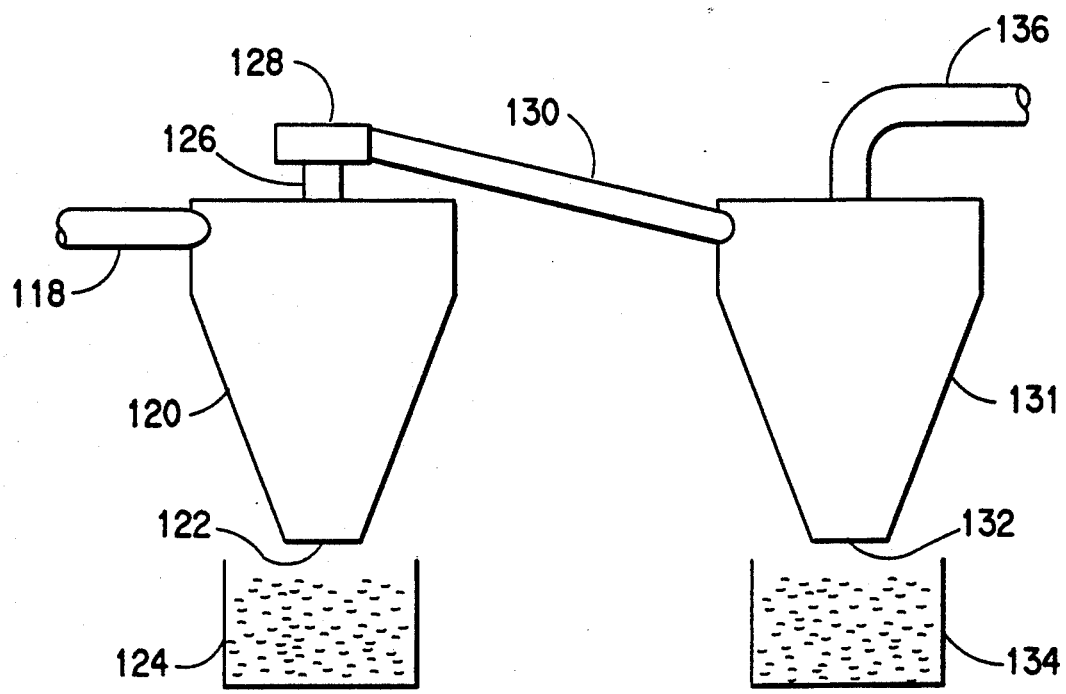

Means are provided for separating PET flakes from the contaminants in this physical mixture. In the embodiment shown in FIG. 7, the chamber 110 is connected by pipe 114 to the inlet of a centrifugal blower 116. Pipe 118 connects the outlet of the blower to a cyclone separator 120 which is best shown in FIG. 9. Thus the centrifugal blower transfers the flakes 112 from the granulator to the cyclone and creates a centrifugal motion within the cyclone to achieve separation of the PET flakes from a substantial proportion of its contaminants physically mixed therewith by specific gravity. The PET flakes and heavy contaminants, e.g., Al, discharge from the bottom end 122 of the cyclone into bin 124 of semi-processed, semi-pure PET flake. The light contaminants of the physical mixture exit the cyclone 120 at the top via an inlet pipe 126 of another centrifugal blower 128. The outlet pipe 130 delivers the "light" contaminates to cyclone 131, which is operated to separate these contaminants from the air flow. Thus, the light contaminants are discharged from the bottom 132 of the cyclone into bin 134. The air flow separated from these contaminants exits the top of cyclone 130 via pipe 136 to a dust collector 138 in bag form as best shown in FIG. 7.

An example of cyclones 120 and 131 is the Sterling Elutriator which subjects the incoming feed to intense air movement so as to help the separation of the PET flakes from contaminants and contaminants from the air, respectively. The elutriators operate similar to cyclones in directing most of the air flow out of the top of the equipment, enabling relatively heavy solid material present in the feed to discharge from the bottom of the equipment. The elutriators, however, direct the feed air stream to the center of the equipment (cone) rather than tangentially, to subject this air stream to greater turbulence, to better separate materials of different specific-gravity from one another. The contaminants collected in bin 134 will be a mixture namely of dust, dirt, PP, HDPE, paper, and some plastic film.

The granulation and separation apparatus (cyclones 120 and 131) described with reference to uncolored PET containers and FIG. 7 can be repeated for receiving the contents of each of the other granulation conveyors 74, 88, and 94. Hence this apparatus associated with conveyor 74 is numbered the same as the apparatus associated with conveyor 68. Such apparatus is also present but not shown for association with conveyors 88 and 94.

For the colored PET containers, the contaminants will be essentially the same as described with respect to the uncolored PET containers. At the present time, the color of these PET containers will almost always be green. For the uncolored and colored HDPE containers, the first cyclone is operated to separate the HDPE flake from still lighter contaminates, and these lighter contaminants are separated from the air stream via the second cyclone as described for the operation of cyclone 130. The contaminants recovered from HDPE flakes will comprise mainly dust, dirt, and paper. The semi-finished, semi-pure HDPE flakes collected from the first cyclone will contain PP impurity by virtue of its similar specific gravity to HDPE. The colored HDPE flakes will be a mixture of HDPE flakes of different color, which finds recycle use in applications where color is unimportant.

The semi-finished, semi-pure PET flakes and HDPE flakes are then wet processed for further purification. Up to this point, the recycle process has been dry. The wet processing of the flakes is done separately on the uncolored and colored PET flakes and on the uncolored and colored HDPE flakes so that they do not contaminate each other. The wet processing of PET flakes will first be described and then the wet processing of HDPE flakes will be described.

The first step in one embodiment for wet processing of PET flakes is subjecting these flakes to means for separating "light" contaminants from the PET flakes by flotation. PET has a specific gravity in the range of 1.3 to 1.4 while HDPE, PP, and PS have a specific gravity of less than 1. In water, the PET flakes will sink while the HDPE, PP, and PS (if any) contaminants which are separable from the PET flakes at this point will float.

Figure 10:
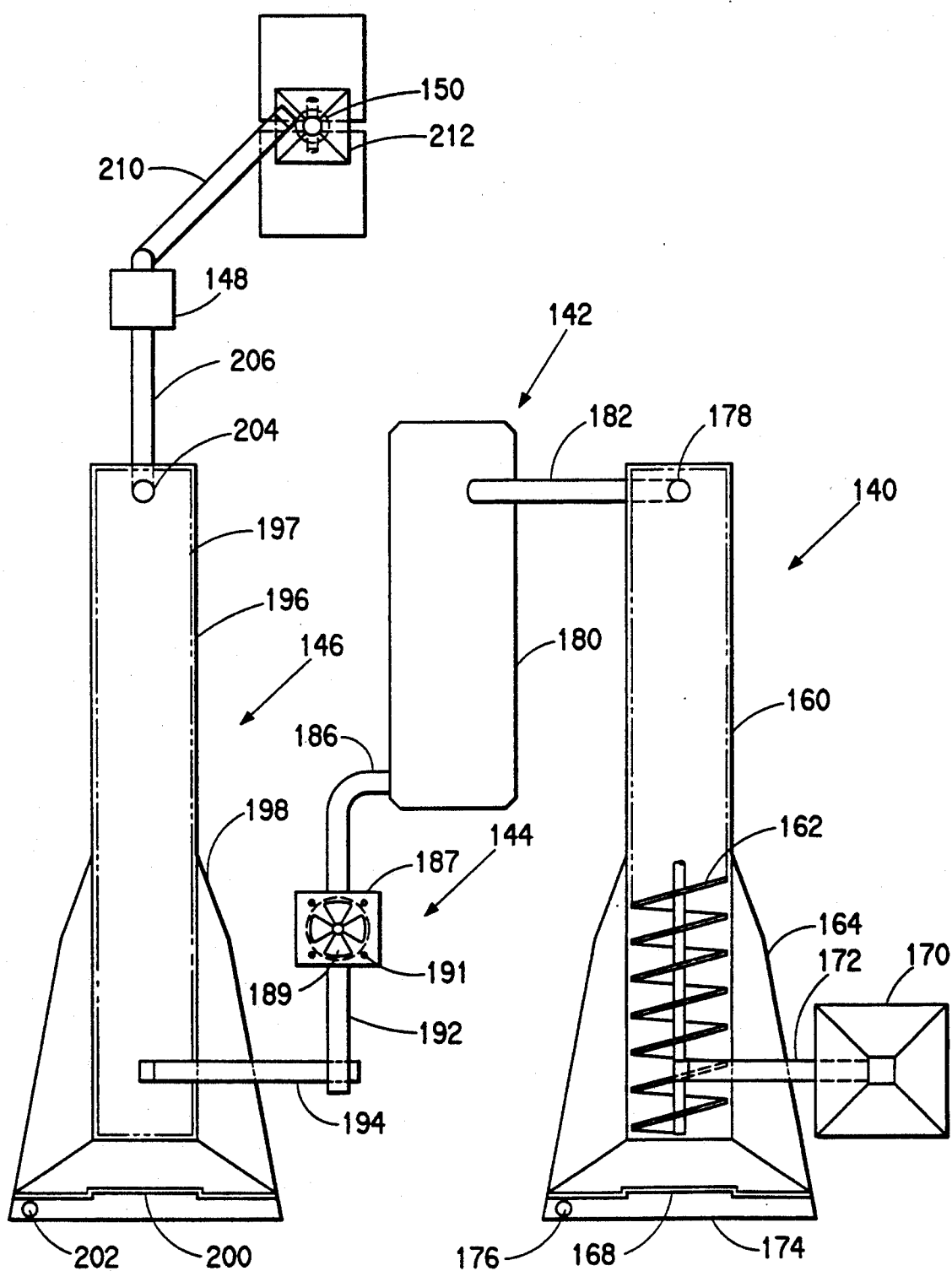

FIG. 10 shows one embodiment of apparatus for carrying out this separation, comprising first flotation separation means 140 feeding PET flakes to glue detachment means 142, which in turn feeds the flakes to intermediate drying means 144 and then to second flotation separation means 146. From there, the flakes are then subjected to final drying means 148 and means 150 for separating metal from the flakes.

Figure 11:
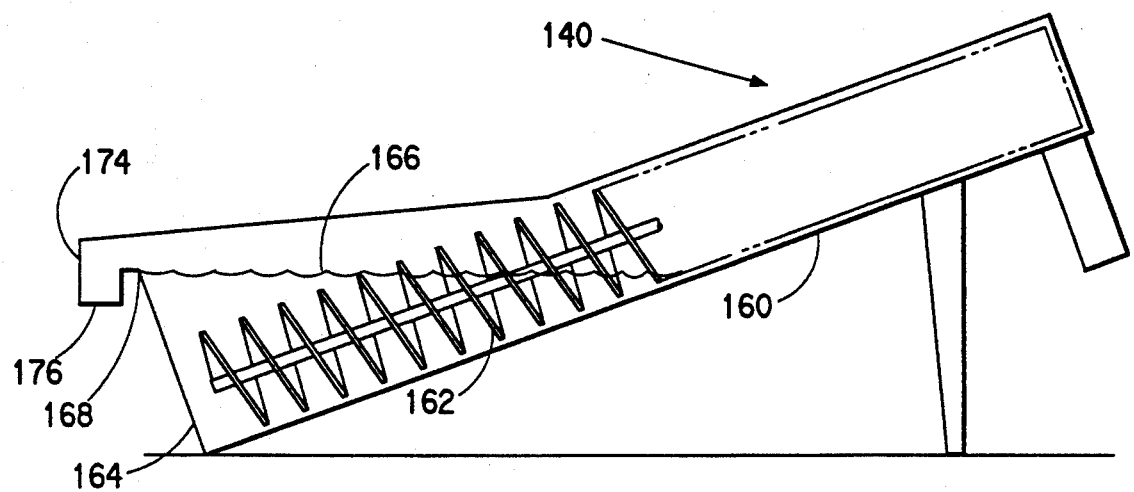

In the embodiment shown in FIG. 10, the first flotation separation means 140 comprises an inclined screw conveyor as best shown in FIG. 11. The conveyor consists of a trough 160, within which is positioned a conveying screw 162 (shown partly in phantom lines) for conveying PET flake from the lower end of the trough to the upper end. The lower end of the trough 160 is part of a tank 164 which is constantly filled with water to a level 166 which is controlled by weir 168 in the back wall of the tank.

In operation, a bin such as bin 124 (FIG. 9) of semi-finished, semi-pure PET flakes is dumped into hopper 170 from which the flakes are conveyed by a screw conveyor 172 to be discharged onto the surface of the water in tank 164. The water in the tank contains surfactant which is effective to cause the flakes to be wet by the water. Typically, the surfactant can be nonylphenoxypolyethoxyethanol nonionic surfactant available as Triton ® N-111 used in an amount to establish a concentration of about 0.02% based on the weight of the water in the tank. An antifoaming agent such as Dow DH10 silicone antifoamer may also be present such as in an amount of about 0.01 weight percent. The water in the tank is agitated by mixing blades (not shown) so as to aid in the flake wetting process but without creating bubbles. The flow of the water in the tank 160 is towards the weir 168. The contaminants having a specific gravity of less than 1 float so that they exit the tank via weir 168, into trough 174 which has a bottom opening 176. The water and light contaminants flow through opening 176. These light contaminants can then be dried, such as by a spin dryer (not shown) and collected in a bin (not shown) for disposal. The contaminants in this bin will comprise paper, some dirt, dissolved residue of the contents of the containers, but will be primarily HDPE, so that the contents of this bin can have value for recycle by melt fabrication.

The PET flakes sink when added to the tank 164. "Heavy" contaminants such as metal, dirt, PVC if present also sink with PET flakes. Contaminants such as portions of PP film labels and HDPE base cups still glued to the PET flakes also tend to sink. Conveyor 162 conveys the flakes and heavy contaminants up the inclined trough 160 to a point above the water level 166 where the soggy mixture of flakes and contaminants are discharged from the first flotation means 140 via bottom opening 178. The embodiment of first flotation means shown in FIGS. 10 and 11 can be obtained from Eagle Iron Works as a spiral classifier.

Figure 12:
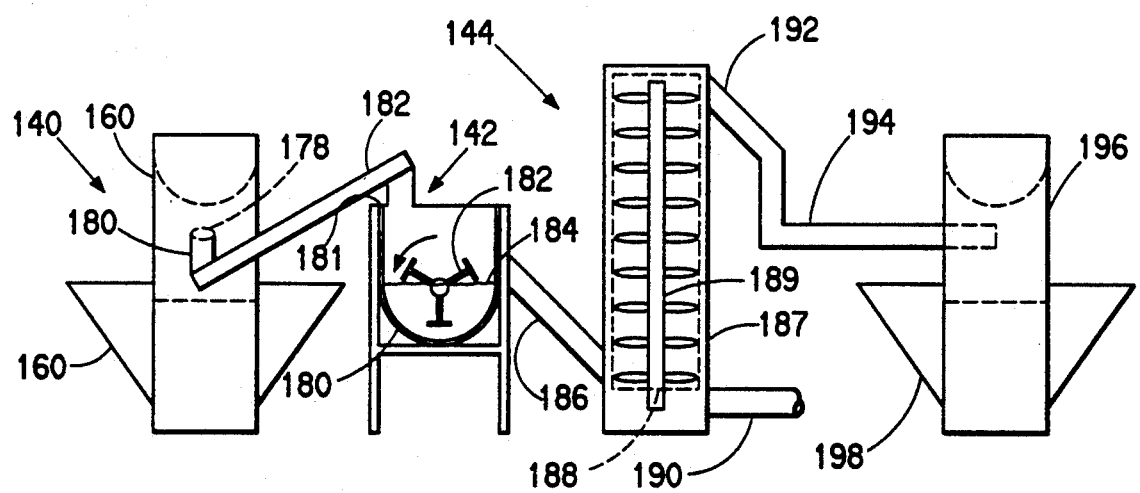

The discharged soggy mixture is conveyed by chute 180 to a screw conveyor 182 which conveys the soggy mixture to the glue detachment means 142 as best shown in FIG. 12.

In the embodiment shown, the glue detachment means is a steam jacketed continuous mixer, available from Marion Mixers, Inc., comprising a tank 180 having a jacket 181 for steam heating the tank, an agitator 182 and water to a level 184 which overflows into pipe 186 for exiting the tank 180. The soggy mixture of PET flakes and contaminants enter the tank 180 at one end and leave at the other end as best shown in FIG. 10. While being highly agitated in the tank 180 (the agitator may rotate at 160 to 170 rpm), this mixture is subjected to conditions which detach the glue present on the PET flakes, by dissolving and/or emulsifying the glue, whereby these flakes can be freed of their adhesively engaged contaminants. In one embodiment of the present invention, the water in tank is heated to 190° F. and contains both surfactant and caustic solution. The surfactant can be the same as used in the first flotation means 140 and the caustic solution can be an aqueous alkaline earth or alkali metal hydroxide such as NaOH used at a concentration of about 3% based on the weight of the water. As the water in the tank 180 overflows out of the tank via pipe 186, this water, surfactant, and caustic are continuously added to the tank. The operation of the glue detachment means can conveniently be carried out at a water feed/overflow rate of about 5 gal./min. The overflow from the tank includes the PET flakes and all of its detached contaminants, e.g., plastic film, paper, metal, PVC, and glue and residue of the container contents (in solution), resulting from the agitation in the tank.

The PET flakes and contaminants are fed by pipe 186 to drying means 144 (FIG. 10). In the embodiment shown, the drying means does rinsing, as well, to wash the caustic solution detached glue and other contaminants off of and away from the PET flakes. As best shown in FIG. 12, the basic components of this drying are a housing 187, a stationary perforated basket 188 positioned vertically within the housing, and a rotating vane assembly 189 positioned within the basket. The overflow from tank 180 enters the drying means via pipe 186 into the bottom of basket 188. The high speed rotation of the vane assembly, e.g., 1000 rpm, forces the flakes upward along the basket wall, while water, detached glue and other contaminants which pass through the perforations in the basket (about 3.2 mm in diameter) to exit the housing via pipe 190. Spray pipes 191 are provided adjacent each corner of housing 187 as best shown in FIG. 10. These spray pipes direct water sprays against the length of the basket to rinse the PET flakes as they traverse the length (height) of the basket 188, to exit the housing via pipe 192.

The recovered caustic solution, rinse water, and solid contaminants are collected from pipe 190, neutralized using base such as $CO_2$, filtered to remove solid contaminants, and then the neutralized solution and filtration contaminants can be disposed of safely.

The purer PET flakes exiting the drying means via pipe 192 have a moisture content of less than 1 weight percent. A dryer operating as just described can be obtained from the Carter Day Company, but other drying equipment could be used as well.

The dried PET flakes are then fed by pipe 192 to second flotation means 146. The second flotation means can be the same as the first flotation means having a trough 196, screw 197 (shown in phantom lines), tank 198, weir 200, overflow opening 202, flake exit opening 204 corresponding to trough 160, screw 162, tank 164, weir 168, and openings 176 and 178, respectively, of the flotation means 140, as shown in FIGS. 10 and 12. Operation of the second flotation means 146 is similar to operation of the first flotation means, except that the floating contaminants flowing across weir 200 will consist mainly of film label, base cup fragments, and paper freed from the PET flakes by the treatment in the glue detachment means 142.

The relatively pure PET flakes exiting the trough 198 via opening 204 are fed by conveyor 206 to a drying means 148 which can be the same as drying means 144 except that spray pipes (pipes 191 shown in FIG. 10) would be unnecessary. The moisture content of the PET flakes will be reduced to less than about 1.0% based on the weight of the flakes plus moisture.

Figure 13:
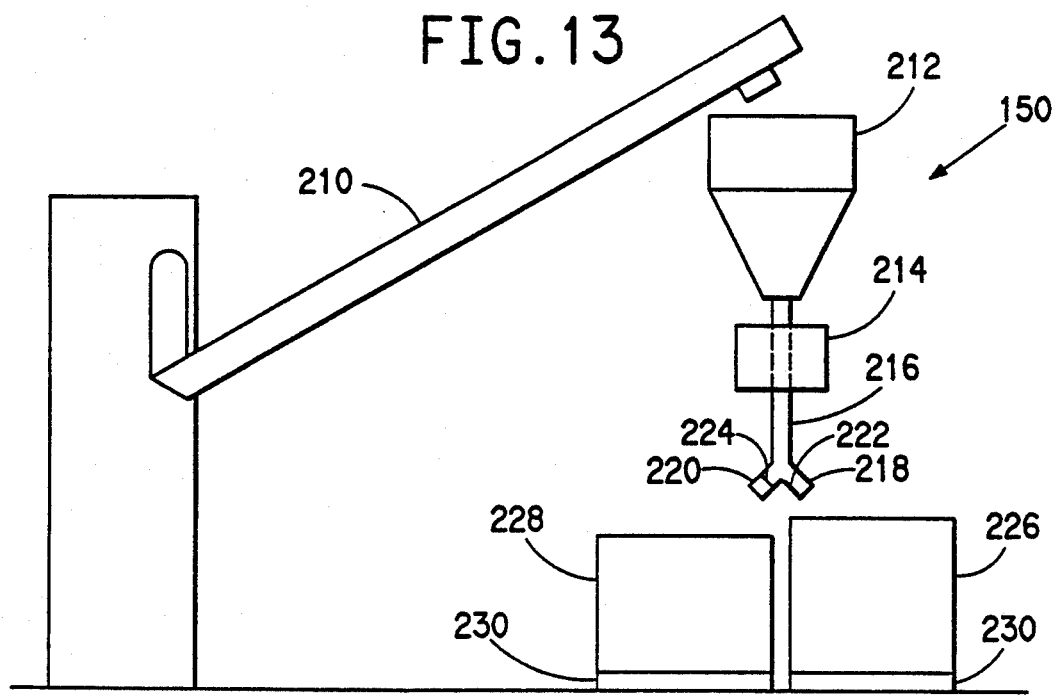

From the drying means 148, the dried PET flakes are conveyed by conveyor 210 to a hopper 212 which feeds the flakes by gravity flow through a metal detector 214 such as is available from the Eriez Magnetics Company as best shown in FIG. 13.

The pipe 216 carrying the PET flakes through the metal detector branches into pipes 218 and 220 at its outlet end. Each pipe is equipped with a gate 222 and 224 to control which branch pipe conveys the PET flakes. Bin 226 is provided to collect the PET flakes without metal contamination and bin 228 is provided to collect PET flakes associated with metal contamination. The gates 222 and 224 are controlled by the metal detector 214, i.e., when metal contaminant is detected in the stream of PET flakes, gate 224 opens and gate 222 closes, so that the stream containing the metal contamination is diverted to bin 228. When no metal contaminant is present in the stream passing through the metal detector 214, gate 224 is in the closed position and gate 222 is open, which is the disposition shown in FIG. 13. This control of the opening and closing of gates 222 and 224 can be accomplished by conventional means generally provided with the metal detector. Each bin is positioned on a pallet 230 for removability from under branch pipes 218 and 220 when filled. The PET flake accompanying the metal contaminant and thereby ending up in bin 228 is relatively small.

The foregoing description of the wet processing of PET flakes can be practiced in the same apparatus whether the flakes be colored or uncolored, by campaigning the apparatus for each type, with clean out of the apparatus after each campaign so as to minimize the contamination of these flakes with each other. A small amount of uncolored PET flakes in colored PET flakes is generally not harmful to the utility of articles to be remelt fabricated from the colored PET flakes. Alternatively, separate wet processing equipment can advantageously be used when the production of PET flakes of both types warrants it.

The PET flakes collected in bin 226 will generally have the following composition: ≦(no greater than) 50 ppm Al, ≦50 ppm HDPE and PP (combined), ≦400 ppm of color containment, ≦50 ppm PVC and PS combined and virtually no detectable paper or dirt.

Figure 14:
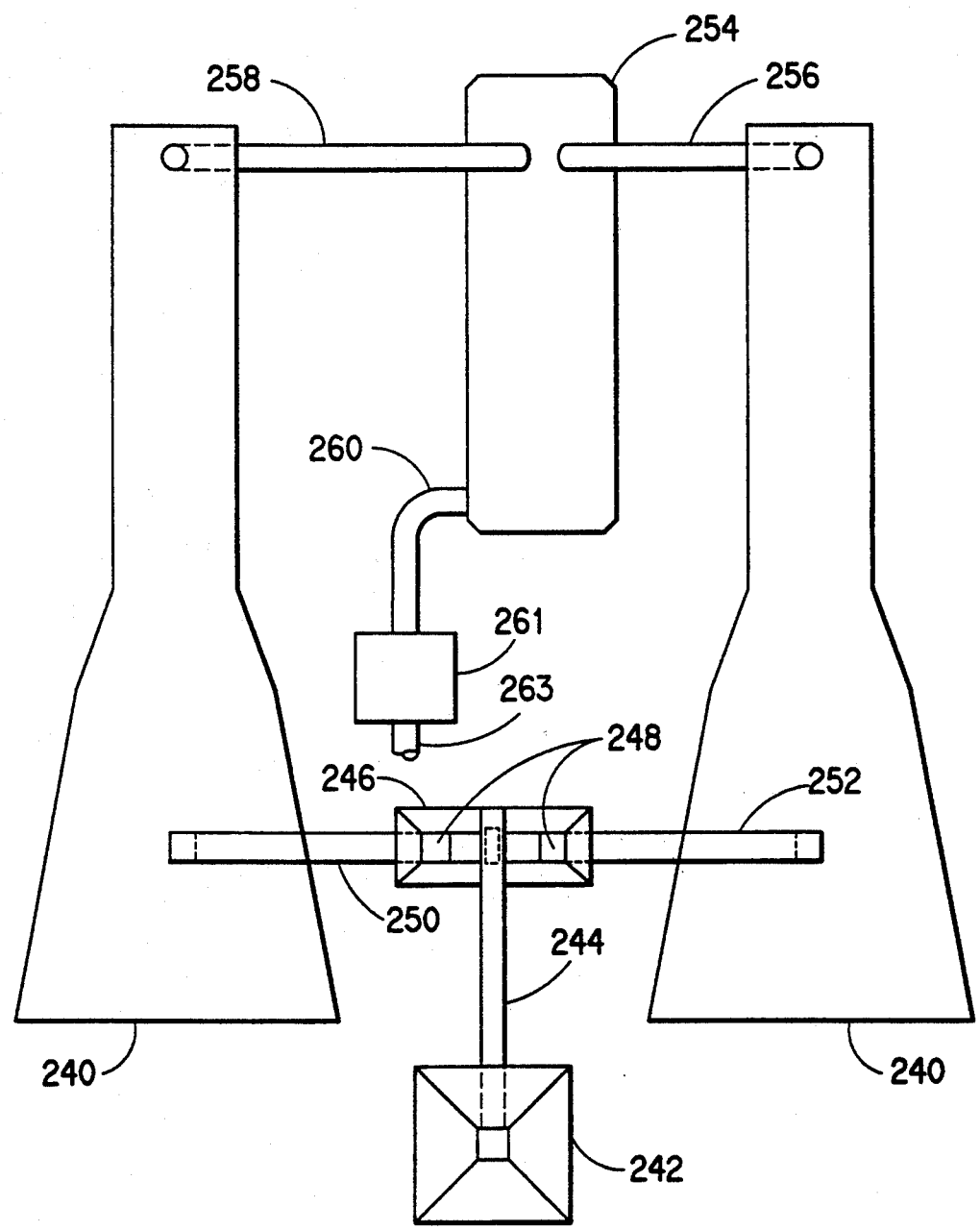

An alternative arrangement for wet processing PET flakes is shown in FIG. 14, comprising a pair of spiral classifiers 240, like those of FIG. 10 fed in parallel with PET flake via hopper 242 for receiving the contents of a bin of semi-finished, semi-pure PET flakes, conveyor 244 for conveying the flakes to a second hopper 246 having two outlets 248, one for supplying feed conveyor 250 and the other for supplying feed conveyor 252, which feed flakes to the spiral classifiers in the same manner as conveyor 172 of FIG. 10. The spiral classifiers 240 can be operated in the same manner as the first flotation means 140 described herein. The PET flake output of both classifiers 240 are fed to one end of the single glue detachment means 254 via conveyors 256 and 258, which can be the same as glue detachment means 142 described hereinbefore. The flake/contaminant output of glue detachment means 254 via outlet pipe 260 can be subjected to drying means 261, which can be the same as drying means 144 (FIG. 10) and the dried flakes exiting the drying means 261 via pipe 263 (conveyor) can be subjected to further processing as may be desired. The caustic solution, rinse water and solid contaminants can be neutralized and filtered for disposal as described hereinbefore. This equipment configuration of a single glue detachment means fed by two spiral classifers provides a greater feed to the glue detachment means which can be handled effectively with the result being an increase in production of pure flake product.

Figure 17:
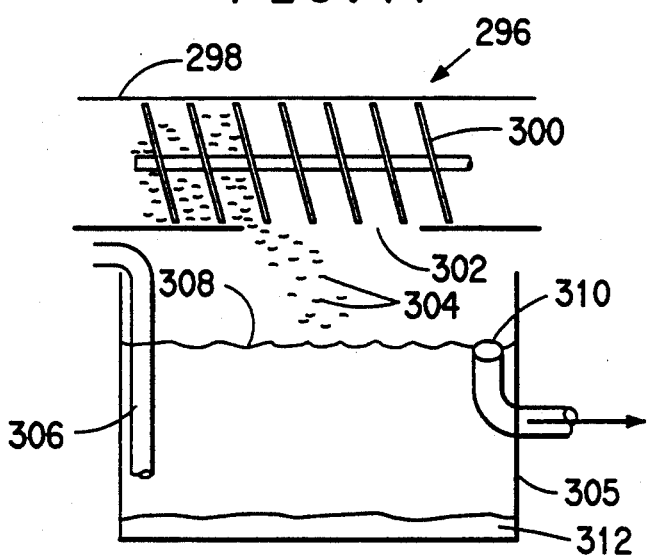
Figure 16:
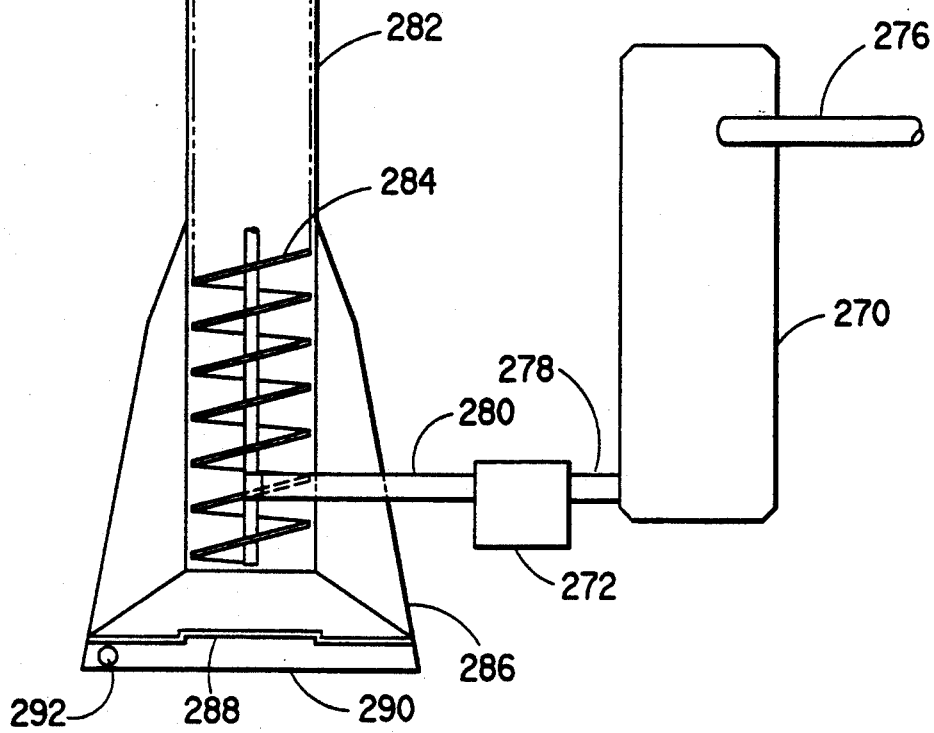

FIGS. 16 and 17 show one embodiment of apparatus for the wet processing of the semi-finished, semi-pure HDPE flake, whether uncolored or colored. In this embodiment, glue detachment means 270 is connected in series with drying means 272 and then with flotation means 274 for wet processing. These can be the same apparatus as the glue detachment means 142, drying means 144, and second flotation means 146 of FIG. 10. Thus the HDPE flake plus contaminants is fed via conveyor 276 to the glue detachment means 270 wherein the hot aqueous solution of caustic and surfactant can be used as for PET flake wet processing. The resultant mixture of HDPE flakes and contaminants, e.g., paper, dirt, dissolved glue, and residue of the contents of the HDPE containers, PP, PET, and metal is fed via outlet pipe 278 to the drying means 272. The rinsing and drying accomplished by drying means 272 washes the caustic and detached glue and residue out from the HDPE flakes and some of the dirt and small particles of other contaminants present. The resultant caustic solution and rinse water and contaminants can then be neutralized and filtered for separate and safe disposal. The resultant rinsed and dried HDPE flakes plus remaining contaminants is fed via conveyor 280 to the flotation means 274 represented by the spiral classifier shown in FIG. 16. The spiral classifier as in the case of flotation means 140 of FIG. 10 comprises an inclined trough 282 and a screw 284 (partly shown by phantom lines) dipping into tank 286 having an weir 288, trough 290 and bottom opening 292. In this case, however, the flotation means is not used for flotation separation, but instead is used just to convey the feed of HDPE flakes to the bottom opening 294.

The relatively pure HDPE flakes are then subjected to sink-float treatment by simplified apparatus to remove higher specific gravity contaminants such as PET and metal from the HDPE flakes. For example the HDPE flakes can be conveyed by screw conveyor 296, with the housing 298 for the screw 300 having an opening 302 in its bottom so that when the conveyed flakes reach the opening, the mixture falls through the opening 298, as is best shown in FIG. 17, with particles 304 representing HDPE flakes.

Positioned beneath the opening 302 is a tank 305 supplied with water via pipe 306 to a level 308 established by overflow pipe 310. The HDPE flakes 304 fall into the water in the tank and because these flakes have a lower specific gravity than the water, they float to be removed from the tank via overflow pipe 310. Heavier contaminants such as metal and PET flakes sink to the bottom of the tank to form a heavy contaminant layer 312 at the bottom of the tank which can be periodically removed simply by draining the tank and shoveling this layer out of the tank for disposal. The HDPE flakes, which may contain up to about 5 weight percent PP contaminant and typically no other containment which is harmful to the recycling of these flakes, can then be dried by passage through drying means such as 148 and a metal separation means such as metal detector 214 in case some metal contaminant still remains in the HDPE flakes.

The apparatus just described can be separately provided for uncolored and colored HDPE flakes or the same equipment can be used for both types of flakes on an alternating campaign basis. Some contamination of the colored HDPE flakes with uncolored HDPE flakes is permissible, but contamination of uncolored HDPE flakes with colored HDPE flakes is undesirable. The colored HDPE flakes consist of a rainbow of colors which when remelted for fabrication into useful articles to present a color ranging from gray to black to brown, depending on the color content input. The apparatus just described can also be the same apparatus used for wet processing of PET flake as shown in FIG. 10, but used on a campaign basis to process the HDPE flake. Thus, the conveyor 276 of FIG. 16 can be the same as conveyor 182 of FIG. 10, and in that case, the first flotation means 140 can be operated dry so as to merely function as a conveyor to get the HDPE flakes plus contaminants to conveyor 276.

Figure 15:
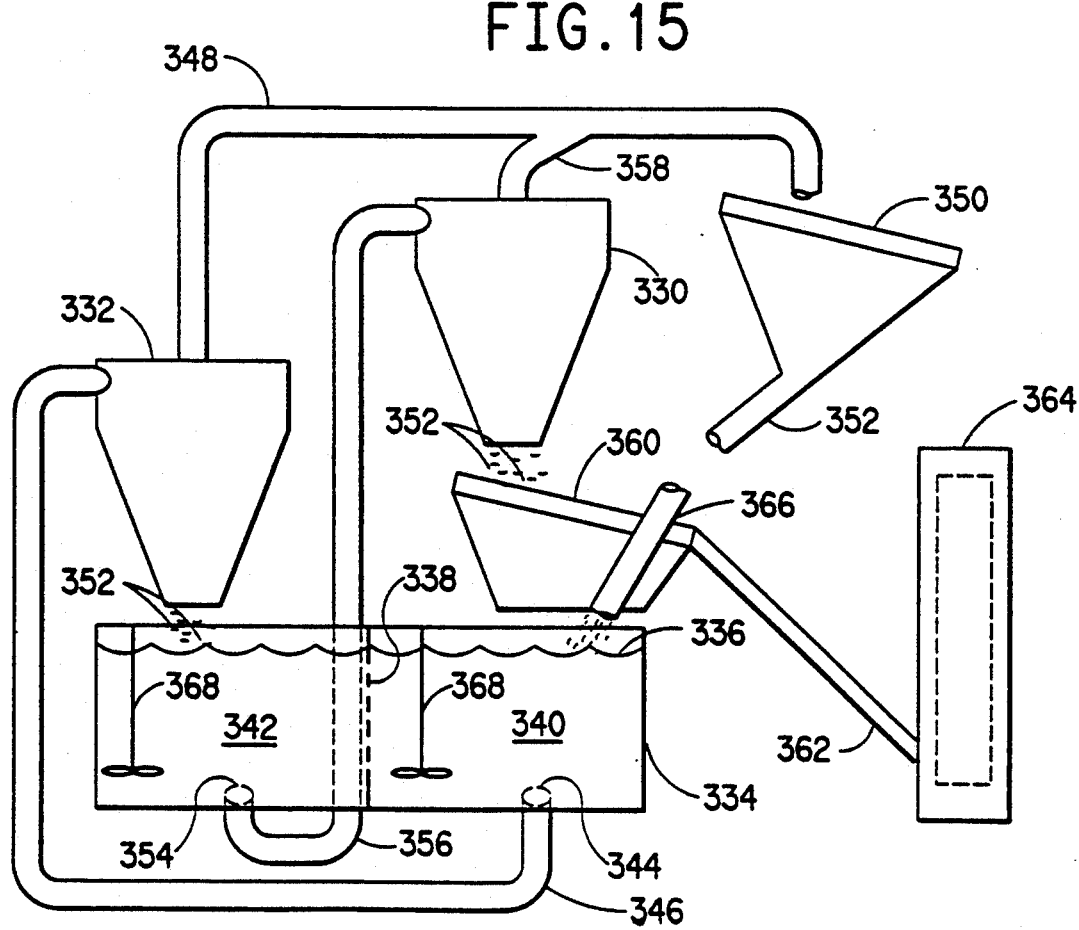

FIG. 15 shows an alternative apparatus for further purification of PET flakes after wet processing in glue detachment means 142 and the drying means 144 (or glue detachment means 254 and drying means 261). The further purification of the PET flakes in this embodiment is accomplished by a pair of hydrocyclones 330 and 332 operating in series as will be further explained hereinafter. Hydrocyclones operate in accordance with the principle of cyclones used to separate materials by specific gravity, except that hydrocyclones use an aqueous medium as the fluid which carries the materials to be separated by specific gravity, instead of air as the carrier medium. As in the case of cyclones, in hydrocyclones, most of the liquid carrier medium, e.g., water, exits the top of the hydrocyclone, carrying with it the solid material of relatively low specific gravity while only a small amount of the liquid carrier medium, e.g., 10%, exits the bottom of the hydrocyclone carrying with it the higher specific gravity material. Hydrocyclones are available, e.g., from SEPCO (Sampson Engineered Products Company).

The system using the hydrocyclones 330 and 332, as shown in FIG. 15, consists essentially of an open top tank 334 filled with water to a level 336 and having a perforated member or screen 338 dividing the tank 334 into two sections 340 and 342 insofar as PET flakes are concerned, but permitting the water to pass from section to section to have the same water level 336. The openings in the screen can be, e.g., about 2 to 4 mm, which does not permit the 9.5 mm flakes to pass through. Section 340 has a bottom opening 344 through which water from section 340 is pumped out of this section by a pump (not shown) through line 346 tangentially into the upper part of hydrocyclone 332. The water carrying the light specific gravity solids exits the hydrocyclone 332 via line 348 and is deposited onto a shaker screen 350 for dewatering of the light specific gravity solids, with the water exiting the screen 350 through pipe 352 being directed back to replenish the water in tank 334.

The heavier specific gravity solids, shown as flakes 352 exiting the bottom of hydrocyclone 332 with the small amount of water falls into section 342 of tank 334. Section 342 has a bottom opening 354 through which the water is pumped through line 356 into hydrocyclone 330, which is equipped with a top exit line 358 which joins exit line 348 so that the light specific gravity solids exiting hydrocyclone 330 are also dewatered by screen 350.

The heavier specific gravity solids exiting the bottom of hydrocyclone 330 fall upon shaker screen 360 for dewatering, with this water being returned to tank 334. The dewatered heavier solids can then be passed by conveyor 362, e.g., a screw conveyor, to a drier 364 which can be the same as drying means 144 except that the spray pipes therein would not be necessary.

The PET flakes from drying means 144 enter the hydrocyclone system shown in FIG. 15 by conveyor means 366, such as a screw conveyor, to fall into section 340 of tank 334. Agitators 368 are provided in each section of the tank to cause all the solids, regardless of specific gravity, to be mixed with the water in the tank 334, rather than having light specific gravity material float on the water surface 336. Thus, the pumping out of water through opening 334 and line 346 causes this water to contain the PET flakes and associated contaminants entering the tank from conveyor means 366. Hydrocyclone 332 separates PET flakes from lower specific gravity contaminants such as HDPE, PP, and paper, with the PET flakes as flakes 352 being discharged into section 342 of tank 334. The contaminants are dewatered by screen 350. The PET flakes and any remaining associated contaminants entering section 342 are subjected to a second separation by joining with the water being pumped out of opening 354, through line 356 into the second hydrocyclone 330, where again, any remaining HDPE, PP, and paper contaminants are separated from the PET flakes. These contaminants join with the contaminant stream from hydrocyclone 332 for dewatering as described above. The dewatered contaminants, containing a high proportion, e.g., at least 80 weight percent and most often at least 95% HDPE, can be dried, passed through a metal separation means such as means 150 (FIG. 10) and has high value as a recycle thermoplastic.

The PET flakes exiting the bottom of hydrocyclone 330, instead of returning to tank 334 are subjected to the dewatering by shaker screen 360 and drying, e.g., using drying means 144 but without spray pipes. The dried PET flakes can then also be passed through metal separation means 150. The water passing through screen 360 can be returned to tank 334.

Heated air instead of room temperature air can be fed to the drier for both the HDPE flakes and the PET flakes to drive the moisture content to substantially less than 1 weight percent, e.g., as low as about 0.5 weight percent.

The use of the two hydrocyclones in series to in essence subject the PET flakes to two separation (purification) treatments is believed to provide better separation efficiency than if only a single pass through a hydrocyclone were used.

By way of example, a feed of about 3000 pounds/hr. of PET flake and associated contaminants from drying means 144 can be processed in the hydrocyclone system of FIG. 15 by a water pumping rate out of openings 344 and 354 of about 300 gal./hr. Of this amount pumped out of opening 344, about 270 gal./hr. will exit the top of hydrocyclone 332 and be returned to tank 334 via line 352, and about 30 gal./hr. will enter tank 334 from the bottom end of hydrocyclone 332. The same relationship will occur for the feed to hydrocyclone 330.

The hydrocyclone system of FIG. 14 is also useful for wet processing HDPE flakes after rinse/drying by drying means 272 (FIG. 16), except that the serial treatment of the HDPE flakes, i.e., exposure to both hydrocyclones, requires some re-piping. Specifically, line 348 from hydrocyclone 332 would return the HDPE flakes to the tank 334 (section 342) so that these flakes could be processed again, through hydrocyclone 330. The HDPE flakes exiting hydrocyclone 330 through line 358 would then be subjected to dewatering on the screen 350.

The PET flakes and any other high specific gravity containment formerly present in the HDPE feed to tank 334 would be taken from the bottom of hydrocyclone 332 and sent to dewatering, drying, and metal detection for collection as useful PET recycle product. Likewise, the PET flakes taken from the bottom of hydrocyclone 330 would be added to those collected from the bottom of hydrocyclone 332.

As many widely different embodiments of this invention may be made without departing from the spirit and scope thereof, it is to be understood that this invention is not limited to the specific embodiments thereof except as defined in the appended Claims.

We claim:

1. Apparatus for the recovery of at least uncolored PET, colored PET, uncolored HDPE, and colored HDPE from a compacted mass of post consumer plastic articles comprising crushed containers of uncolored PET, or colored PET, of uncolored HDPE, and of colored HDPE and at least two additional plastics selected from the group consisting of articles of polypropylene, polystyrene, and polyvinyl chloride, and at least three contaminants selected from the group consisting of paper, metal, glue, plastic film, dirt and residue from the contents of said containers, the association of said containers and contaminants in said compacted mass including both (i) a physical mixture thereof as in the case of a mixture of containers of different plastic identities and as in the case of containers being associated by coating with the residue of their contents and/or dirt, (ii) mechanical engagement between plastic containers or between plastic containers and said contaminants as in the case of screw-on bottle caps on containers and retaining rings for said caps, and (iii) adhesive engagement between plastic containers and contaminants caused by said glue as in the case of container labels and base cups for containers, whereby a plastic article in said engagement with a plastic container of different plastic identity is also a contaminant for said different plastic, said apparatus comprising (a) means for breaking down the physical mixture of said crushed containers in said compacted mass into individual containers, (b) means for conveying said individual containers and their associated contaminants along a path, including means for distributing said containers within said path so as to be separable from one another by sortation, (c) means for sorting said containers of uncolored PET, colored PET, uncolored HDPE, and colored HDPE from one another and from the remainder of the broken-down compacted mass being conveyed by said conveying means, by selective removal of said containers of uncolored PET, colored PET, uncolored HDPE, and colored HDPE from said conveying means, said containers including their associated contaminants, (d) means for collecting the remainder of said broken-down compacted mass after being subjected to said sorting means, (e) means for separately granulating the sorted containers of uncolored PET, colored PET, uncolored HDPE, and colored HDPE to form flakes of said containers (f) means for separating said contaminants from the flakes of said granulated articles, which contaminants become separable from said flakes as a result of being subjected to said granulating means, (g) means for treating said flakes to remove the remaining contaminants therefrom, said treatment including wet processing so as to remove any dirt, residue of contents, and at least the glue present on said flakes, whereby the adhesively engaged contaminants become removable from said flakes, (h) means for drying the resultant substantially pure flakes, and (i) means for collecting the resultant substantially pure flakes of uncolored PET, colored PET, uncolored HDPE, and colored HDPE separate from one another so as to be available for recycling by melt fabrication.

2. The apparatus of claim 1 wherein each said means up to and including said separating means operate dry.

3. The apparatus of claim 1 wherein said compacted mass contains at least about 30 weight percent PET, at least about 30 weight percent HDPE, at least about 0.5 weight percent PVC, at least about 0.5 weight percent PP, and at least about 0.5 weight percent PS, all based on the total weight of the compacted mass.

4. The apparatus of claim 1 wherein said compacted mass is in the form of a succession of bales, and said means for breaking down the physical mixture of said crushed containers includes opposing tooth means, moving relative to one another to define a gap, and means for forcing each said bales into said gap wherein the cooperation between said opposing tooth means and said forcing means cause a succession of individual crushed containers from each said bale to pass through said gap substantially separated from the other crushed containers in each said bales, until all the crushed containers of each said bales are passed through said gap.

5. The apparatus of claim 1 including means for collecting the individual containers in a predetermined amount, and means for delivering individual containers from said predetermined amount to said conveying means, means responsive to the amount of individual containers delivered by said delivering means to stop the operation of said breaking down means when said predetermined amount of individual containers in said collecting means is reached, whereby the operation of said breaking down means is intermittent relative to the operation of said delivering means, enabling said breaking down means to operate at a faster rate than said delivering means.

6. The apparatus of claim 5 wherein said delivering means include inclined rotating cylinder means for receiving said individual containers and tumbling them by gravity flow to discharge them onto said conveying means, said tumbling serving to further separate said containers one from the other and from associated contaminants that can be separated from said containers by said tumbling.

7. The apparatus of claim 6 wherein said cylinder means is perforated to permit said contaminants up to the size of the perforations to pass laterally outside of said cylinder means so as to be separated from said tumbled containers.

8. The apparatus of claim 1 wherein said conveying means includes a first conveyor for receiving said containers and said associated contaminants and said sorting means includes means for separating said containers of uncolored PET and colored PET from the remaining containers and associated contaminants on said first conveyor means.

9. The apparatus of claim 8 wherein said conveying means includes a pair of second conveyors, one for receiving the containers of uncolored PET and colored PET from said first conveyor and the other for receiving the remaining containers and associated contaminants, and said sorting means carries out its sortation of containers of uncolored PET from said containers of colored PET from said one conveyor and carries out the sortation of said containers of uncolored HDPE from said containers of colored HDPE and the remaining containers and associated contaminants on said other conveyor.

10. The apparatus of claim 1 wherein said separating means for said flakes of granulated uncolored or colored PET articles includes means for classifying said flakes of PET bottles by specific gravity so as to separate at least PET and HDPE/polypropylene one from the other, and said wet processing means includes means for contacting the resultant flakes with liquid for detaching said glue and other soluble contaminants from said flakes and thereby freeing up adhesive engagement between said flakes and contaminants glued thereto, and means for isolating said detached contaminants from said flakes.

11. The apparatus of claim 10 wherein said liquid is heated aqueous caustic solution and wherein contaminants detached from said flakes remain in said solution after isolation from said flakes, and means are provided for neutralizing said caustic solution and for separation of said detached contaminants from said neutralized solution for independent disposal.

12. The apparatus of claim 1 wherein said treating means for said flakes of granulated uncolored or colored HDPE articles includes
   (i) said wet processing obtained by means for contacting the resultant flakes with liquid for detaching said glue and other soluble contaminants from said flakes and thereby freeing up adhesive engagement between said flakes and contaminants glued thereto, and,
   (ii) means for isolating said detached contaminants from said flakes.

13. The apparatus of claim 10 wherein said wet processing means includes means for floatation separation of flakes and contaminants by specific gravity, whereby at least HDPE flakes are floated away from PET flakes, means for conveying the resultant of PET flakes out of said flotation means and into said liquid contacting means.

14. The apparatus of claim 13 wherein a plurality of said flotation means are provided in parallel operation and said liquid contacting means is a single means.

15. The apparatus of claim 13 and additional means for wet processing said flakes after isolation by said isolating means, said additional means including hydrocyclone means for separating contaminants having a lower specific gravity than that of PET out of said flakes of PET.

16. The apparatus of claim 13 and additional means for wet processing said flakes after isolation by said isolating means, said additional means including hydrocyclone means for separating contaminants having a higher specific gravity than that of HDPE out of said flakes of HDPE.

* * * * *